United States Patent
Nakai et al.

[11] Patent Number: 5,936,783
[45] Date of Patent: Aug. 10, 1999

[54] IMAGE READOUT LENS AND IMAGE READOUT APPARATUS USING THE SAME

[75] Inventors: Yoko Nakai; Hiromitsu Yamakawa, both of Omiya, Japan

[73] Assignee: Fuji Photo Optical Co., Ltd., Saitama, Japan

[21] Appl. No.: 09/215,140

[22] Filed: Dec. 18, 1998

[30] Foreign Application Priority Data

Dec. 25, 1997 [JP] Japan ................................. 9-367207

[51] Int. Cl.$^6$ ................................................ G02B 9/34
[52] U.S. Cl. ........................................ 359/773; 359/771
[58] Field of Search ............................... 359/773, 771, 359/740

[56] References Cited

U.S. PATENT DOCUMENTS

| | | | |
|---|---|---|---|
| 4,359,271 | 11/1982 | Mihara | 359/773 |
| 4,368,956 | 1/1983 | Yamada et al. | 359/773 |
| 4,373,786 | 2/1983 | Yamada | 359/773 |
| 4,413,888 | 11/1983 | Sato | 359/773 |
| 4,443,069 | 4/1984 | Mihara | 359/773 |
| 4,521,084 | 6/1985 | Kurihara | 359/773 |
| 4,606,607 | 8/1986 | Kurihara | 359/773 |
| 4,792,216 | 12/1988 | Kudo | 359/773 |
| 4,810,074 | 3/1989 | Kudo et al. | 359/773 |
| 5,499,142 | 3/1996 | Ohshita | 359/773 |

FOREIGN PATENT DOCUMENTS 3211070 11/1982 Germany ................................. 359/773

*Primary Examiner*—Georgia Epps
*Assistant Examiner*—Evelyn A Lester
*Attorney, Agent, or Firm*—Snider & Chao, LLP; Ronald R. Snider

[57] ABSTRACT

A four-element lens configuration of positive, negative, positive, and negative satisfies predetermined conditional expressions, thereby correcting various kinds of aberration and achieving compactness and wider angle of view in a readout lens system. Further, without using an expensive glass material, higher image quality is attained. Successively from the object side, a first lens $L_1$ made of a positive meniscus lens having a convex surface directed onto the object side, a second lens $L_2$ made of a biconcave lens, a third lens $L_3$ made of a biconvex lens, and a fourth lens $L_4$ made of a negative meniscus lens having a convex surface directed onto the imaging surface side are arranged and configured so as to satisfy the following conditional expressions:

$$-5.5 < f_{12}/f < -2.8 \tag{1}$$

$$0.36 < f_3/f < 0.46 \tag{2}$$

$$-1.14 < f_2/f_3 < -0.8 \tag{3}$$

$$-8.8 < f_4/D_6 < -6.0 \tag{4}$$

$$0.23 < R_1/f < 0.34 \tag{5}$$

4 Claims, 12 Drawing Sheets

F I G. 2
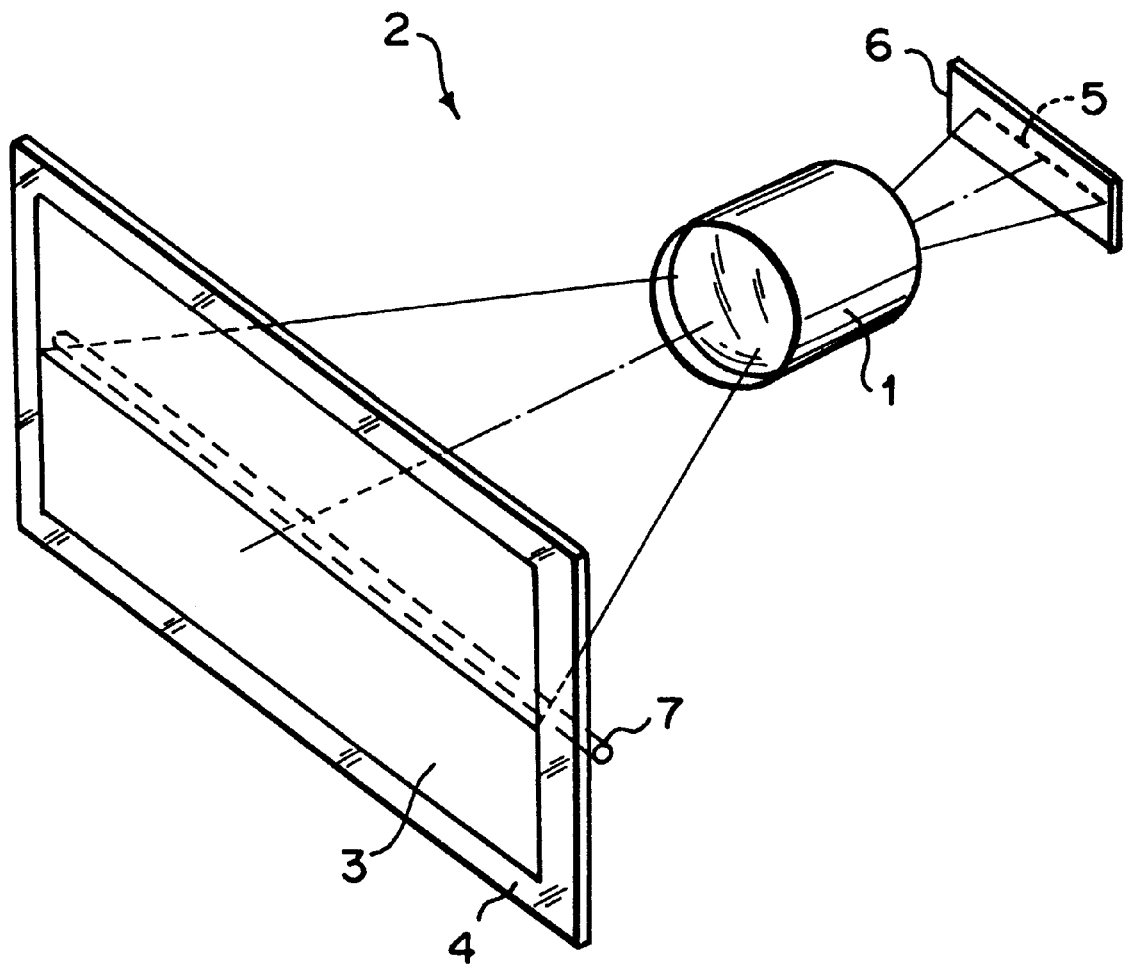

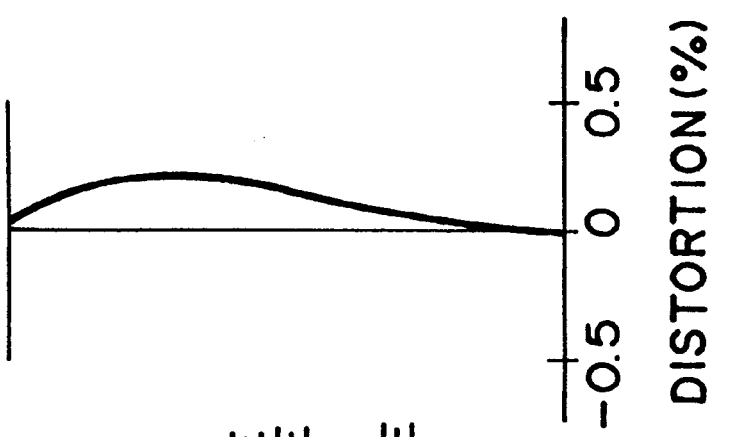
FIG. 3C EXAMPLE 1 ω=24.2°
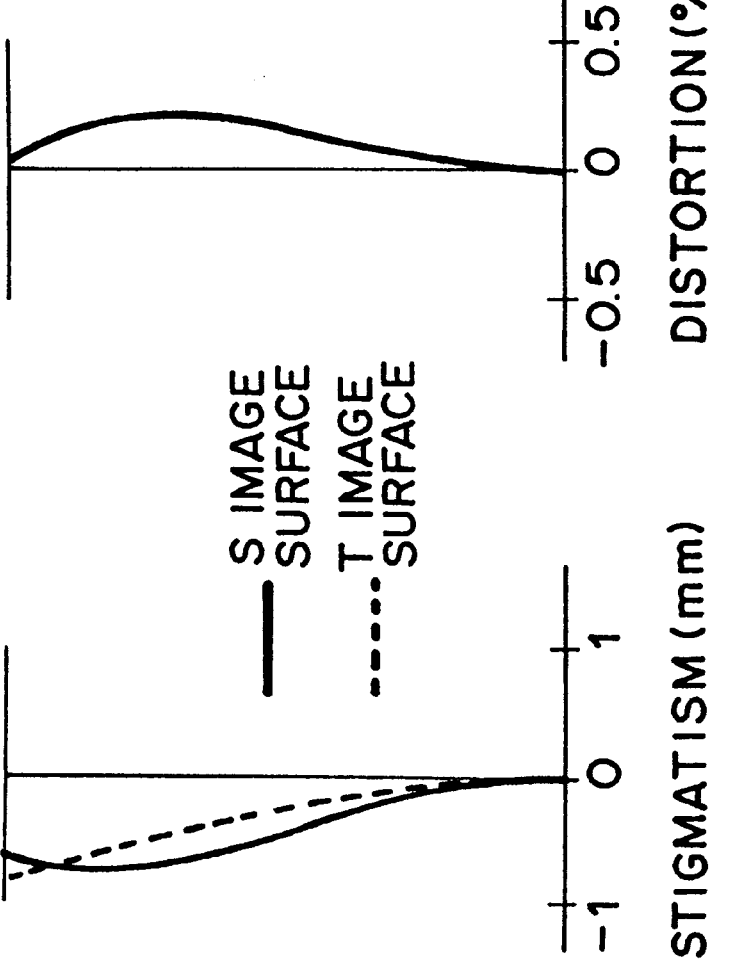
FIG. 3B EXAMPLE 1 ω=24.2°
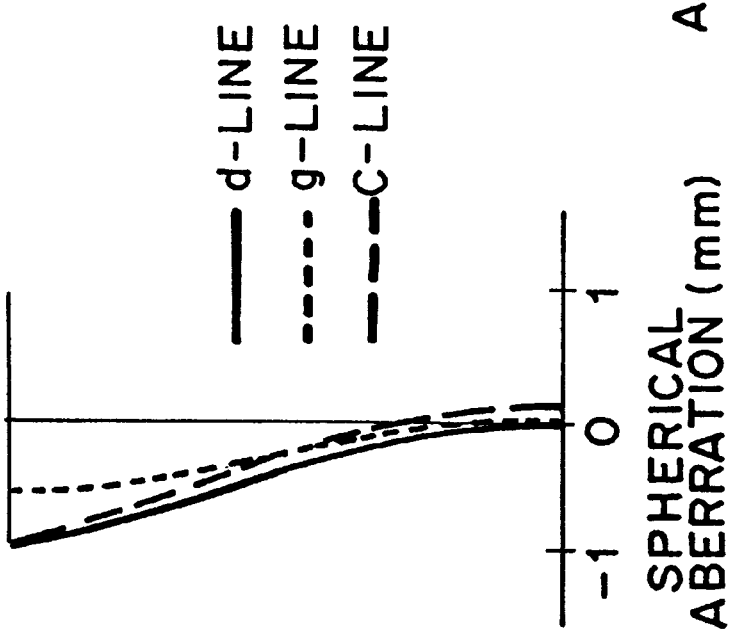
FIG. 3A EXAMPLE 1 F/4.5

EXAMPLE 1

ω = 0°

EXAMPLE 1

ω = 17.5°

EXAMPLE 1

ω = 24.2°

FIG. 5C EXAMPLE 2
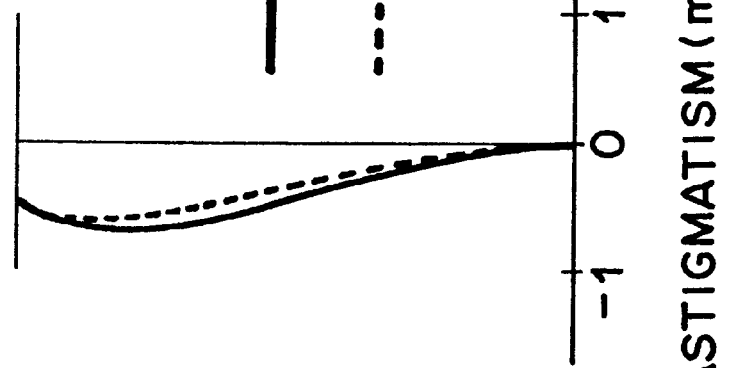
FIG. 5B EXAMPLE 2
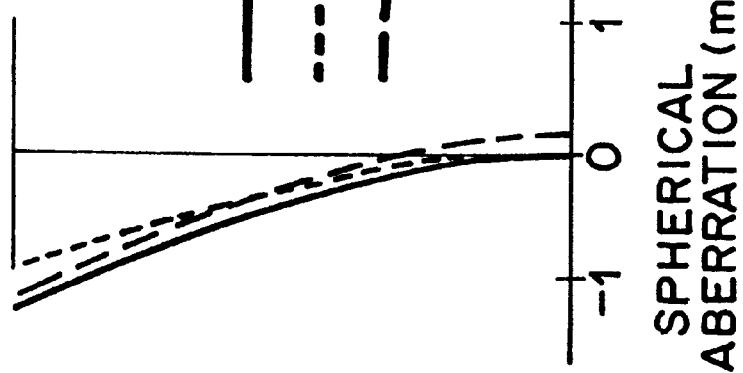
FIG. 5A EXAMPLE 2

F I G.6A
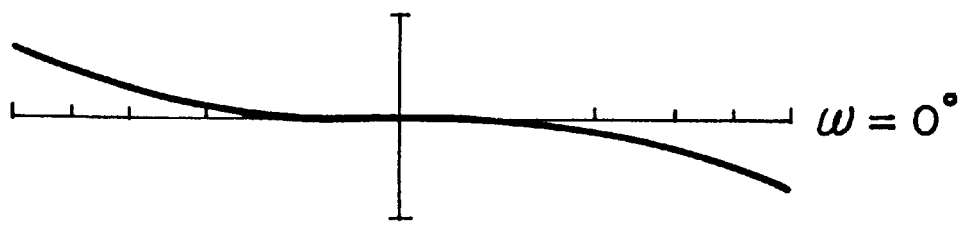
F I G.6B
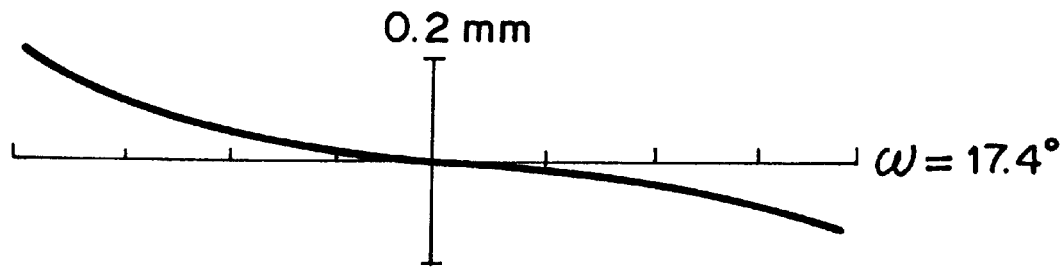
F I G.6C
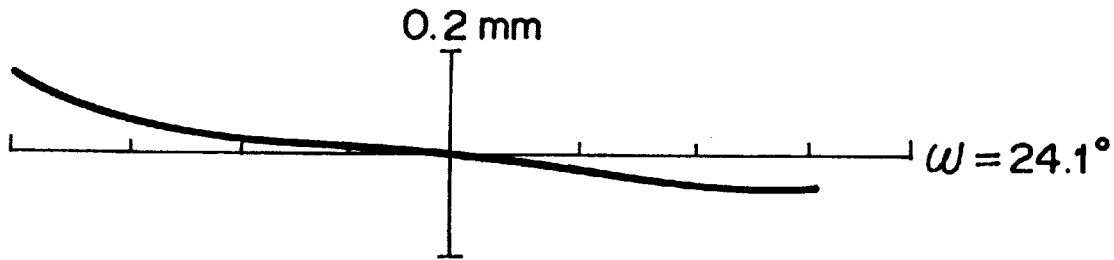

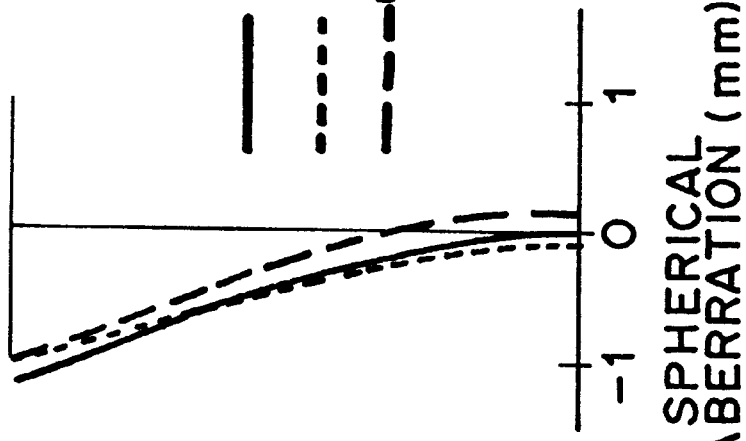
FIG. 7C EXAMPLE 3
FIG. 7A EXAMPLE 3
FIG. 7B EXAMPLE 3

EXAMPLE 3

ω = 0°

EXAMPLE 3

ω = 17.4°

EXAMPLE 3

ω = 24.1°

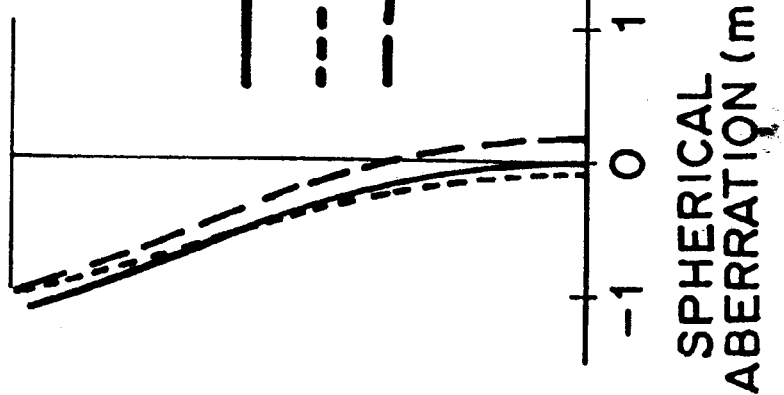
FIG.9A EXAMPLE 4 F/4.5
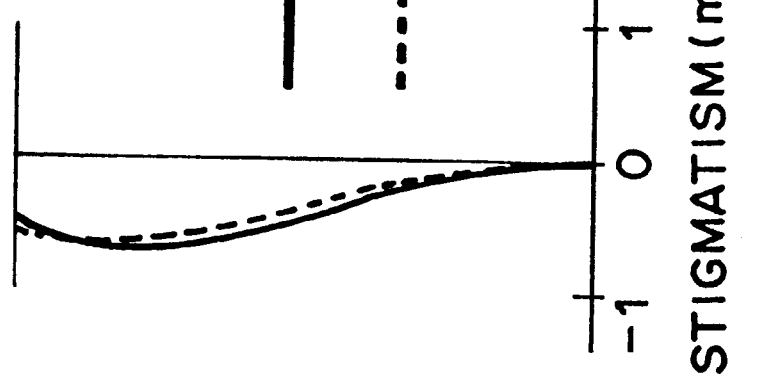
FIG.9B EXAMPLE 4 ω=24.1°
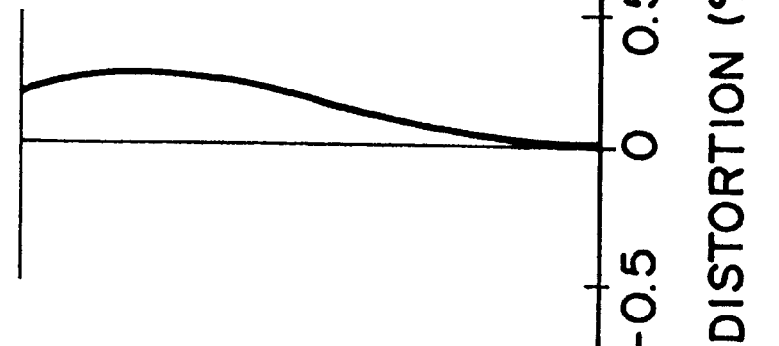
FIG.9C EXAMPLE 4 ω=24.1°

EXAMPLE 4

$\omega = 0°$

EXAMPLE 4

$\omega = 17.4°$

EXAMPLE 4

$\omega = 24.1°$

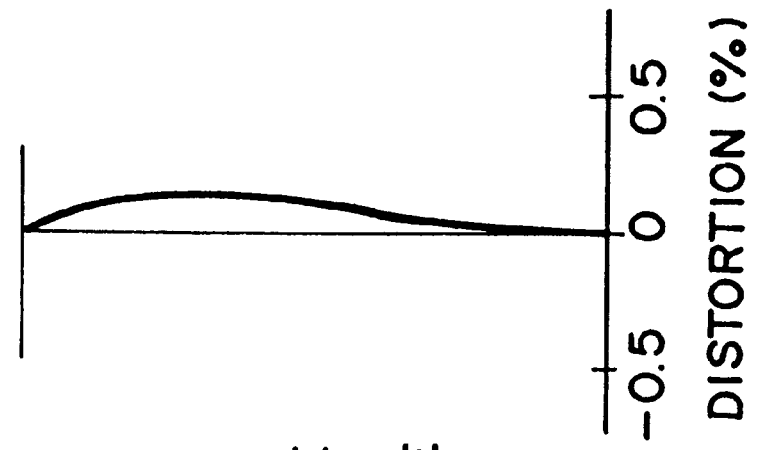
FIG.11A EXAMPLE 5 F/6.0
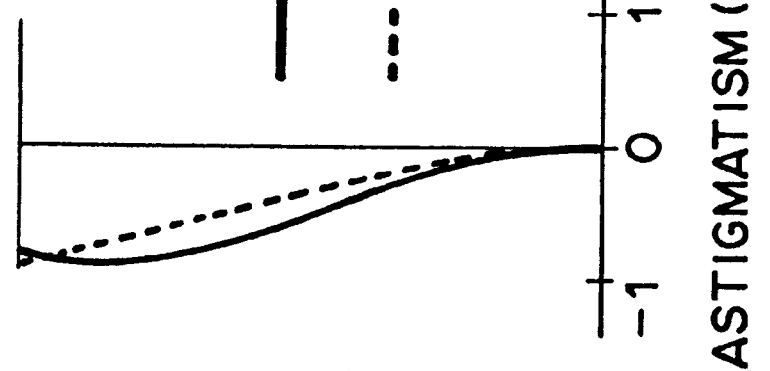
FIG.11B EXAMPLE 5 ω=23.7°
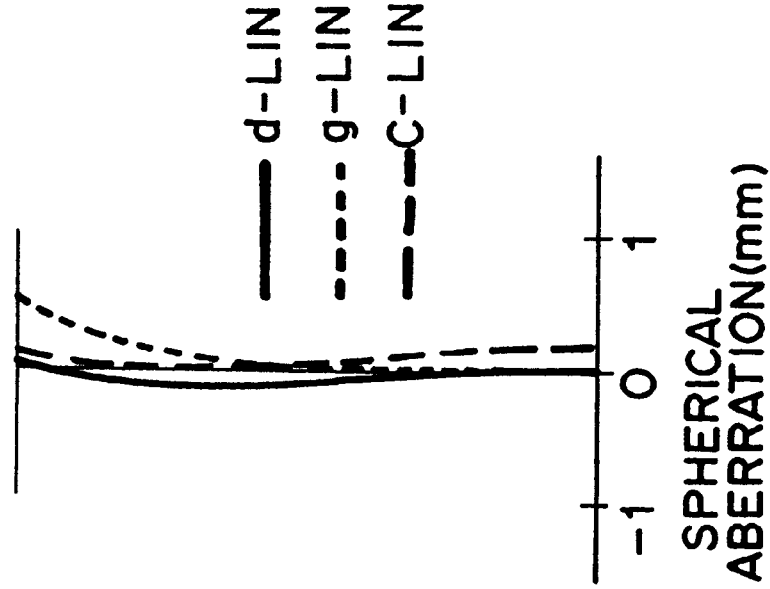
FIG.11C EXAMPLE 5 ω=23.7°

EXAMPLE 5
0.2 mm $\omega = 0°$

EXAMPLE 5
0.2 mm $\omega = 17.1°$

EXAMPLE 5
0.2 mm $\omega = 23.7°$

IMAGE READOUT LENS AND IMAGE READOUT APPARATUS USING THE SAME

RELATED APPLICATIONS

This application claims the priority of Japanese Patent Application No. 9-367207 filed on Dec. 25, 1997, which is incorporated herein by reference.

BACKGROUND OF THE INVENTION

1. Field of the Invention

The present invention relates to an imaging lens for reading out images, employed in an optical system of an image readout apparatus such as facsimile machine or image scanner, for example, and an image readout apparatus using the same; and, in particular, to an image readout lens for reducing or enlarging images.

2. Description of the Prior Art

Imaging lenses for image readout employed in facsimile machines, image scanners, and the like of a type adapted to form reduced or enlarged images of original images onto imaging devices such as CCD have been basically required to have a high resolution at an imaging magnification employed, a large marginal light quantity, and a small distortion. In addition, together with the recent demands for the optical apparatus as a whole to be more compact and less expensive, the lenses have also been required to have a compact size and to be made at a lower cost.

Known as an imaging lens which can correspond to such requirements are compact, four-element imaging lenses disclosed in Japanese Unexamined Patent Publication No. 1-183614 and 9-101452.

In order to achieve performances equivalent to those of a six-element imaging lens in a four-element lens configuration, the imaging lens disclosed in the above-mentioned Japanese Unexamined Patent Publication No. 1-183614 employs an expensive glass material having a high refractive index.

Though the above-mentioned Japanese Unexamined Patent Publication No. 9-101452 includes an example using a relatively inexpensive glass material, such an example yields a brightness on the order of F/5 to 5.6, and a half angle of view ω on the order of 19° to 20°. On the other hand, examples yielding F/3.5 to 4 have a half angle of view ω on the order of 17° to 18° and employ an expensive glass material. Consequently, inexpensive imaging lenses have been desired, which are further excellent in terms of performances.

By increasing the angle of view, such an image readout lens can shorten the distance between the object and the image surface, so as to reduce the size of the apparatus. Consequently, there has been a demand for an image readout lens having a wider angle of view while maintaining high performances.

SUMMARY OF THE INVENTION

In view of such circumstances, it is an object of the present invention to provide a bright image readout lens composed of four lens elements, adapted to attain a wide angle of view, and yielding good qualities in read-out images at a low cost; and an image readout apparatus using the same.

The image readout lens in accordance with the present invention comprises, successively from an object side, a first lens made of a positive meniscus lens having a convex surface directed onto the object side, a second lens made of a biconcave lens, a third lens made of a biconvex lens, and a fourth lens made of a negative meniscus lens having a convex surface directed onto an imaging surface side; satisfying the following conditional expressions:

$$-5.5 < f_{12}/f < -2.8 \quad (1)$$

$$0.36 < f_3/f < 0.46 \quad (2)$$

$$-1.14 < f_2/f_3 < -0.8 \quad (3)$$

$$-8.8 < f_4/D_6 < -6.0 \quad (4)$$

$$0.23 < R_1/f < 0.34 \quad (5)$$

where f is the focal length of the whole lens system;

$f_{12}$ is the composite focal length of the first and second lenses;

$f_2$ is the focal length of the second lens;

$f_3$ is the focal length of the third lens;

$f_4$ is the focal length of the fourth lens;

$R_1$ is the radius of curvature of the first surface; and $D_6$ is the distance from the sixth surface to the seventh surface.

Preferably, the image readout lens is made of a material free of lead and arsenic.

The image readout apparatus in accordance with the present invention is characterized in that the above-mentioned image readout lens is employed.

Preferably, in the image readout apparatus, the image readout lens is disposed between a glass plate for mounting an original and a cover glass of a linear CCD.

The image readout lens in accordance with the present invention can be used as an image-reducing lens when the first, second, third, and fourth lenses are successively arranged in this order from the object side as mentioned above. When the direction of the whole lens system is reversed as it is, so that the first, second, third, and fourth lenses are successively arranged in this order from the imaging surface side, it can be used as an image-enlarging lens.

While in a compact lens configuration composed of four elements, by satisfying the above-mentioned conditional expressions (1) to (5), the image readout lens in accordance with the present invention can act as an image readout lens optimal for reading out images extending over the shorter sides of A4 to A3 sizes.

Conditional expression (1) defines the ratio $f_{12}/f$ of the composite focal length $f_{12}$ of the first and second lenses to the focal length f of the whole lens system. When the value of $f_{12}/f$ is outside the upper and lower limits of conditional expression (1), image surface curvature and spherical aberration cannot favorably be corrected. Also, when the value of $f_{12}/f$ is lower than the lower limit, it becomes necessary to use an expensive glass material having a higher refractive index as the first lens, thus increasing the manufacturing cost.

Conditional expression (2) defines the ratio $f_3/f$ of the composite focal length $f_3$ of the third lens to the focal length f of the whole lens system. When the value of $f_3/f$ is outside the upper and lower limits of conditional expression (2), image surface curvature and spherical aberration cannot favorably be corrected. Also, when the value of $f_3/f$ is lower than the lower limit, it becomes necessary to use an expensive glass material having a higher refractive index as the third lens, thus increasing the manufacturing cost.

Conditional expression (3) defines the ratio of the focal length $f_2$ of the second lens to the focal length $f_3$ of the third lens. When the value of $f_2/f_3$ exceeds the upper limit of conditional expression (3), spherical aberration would be corrected in excess. Also, when the value of $f_2/f_3$ is lower than the lower limit, spherical aberration would be corrected insufficiently, whereby favorable imaging performances cannot be obtained.

Conditional expression (4) defines the ratio of the focal length $f_4$ of the fourth lens to the distance $D_6$ from the sixth surface to the seventh surface. When the value of $f_4/D_6$ exceeds the upper limit of expression (4), image surface curvature and distortion cannot favorably be corrected, and both outside diameter and overall length of the lens would increase. Also, when the value of $f_4/D_6$ is lower than the lower limit, distortion becomes too large on the positive side, and it becomes impossible to choose a material for favorably correcting chromatic aberration in magnification to be used for the fourth lens. Namely, when the value of $f_4/D_6$ is set within a predetermined range in conditional expression (4), the apparatus can attain compactness, and image surface curvature and various kinds of aberration are corrected favorably, whereby high-quality readout images can be obtained.

Conditional expression (5) defines the ratio of the radius of curvature $R_1$ of the first surface to the focal length f of the whole lens system. When the value of $R_1/f$ exceeds the upper limit of conditional expression (5), coma would be corrected insufficiently, thus failing to yield favorable imaging performances. Also, when the value of $R_1/f$ is lower than the lower limit, coma would be corrected in excess, whereby favorable imaging performances cannot be obtained. There are cases where, even when the value of $R_1/f$ is outside a predetermined range in conditional expression (5), favorable imaging performances can be obtained by using a material having a high refractive index as the first lens. Such a material having a high refractive index is expensive and increases the manufacturing cost, thus contradicting the object of the present invention, whereby it is hard to employ.

As explained above, when the above-mentioned conditional expressions (1) to (5) are satisfied, a high-performance image readout lens having a relatively high brightness of about F/4.5 and a wide half angle of view ω of about 24°, using a relatively inexpensive glass material can be provided.

BRIEF DESCRIPTION OF THE DRAWINGS

FIG. 2 is a schematic view showing an image readout apparatus using an image readout lens in accordance with Examples 1 to 5 of the present invention;

FIGS. 3A, 3B and 3C are aberration charts (showing spherical aberration, astigmatism, and distortion) of the lens in accordance with Example 1;

FIGS. 5A, 5B and 5C are aberration charts (showing spherical aberration, astigmatism, and distortion) of the lens in accordance with Example 2;

FIGS. 6A, 6B and 6C are aberration charts (showing coma) of the lens in accordance with Example 2;

FIGS. 7A, 7B and 7C are aberration charts (showing spherical aberration, astigmatism, and distortion) of the lens in accordance with Example 3;

FIGS. 9A, 9B and 9C are aberration charts (showing spherical aberration, astigmatism, and distortion) of the lens in accordance with Example 4;

FIGS. 11A, 11B and 11C are aberration charts (showing spherical aberration, astigmatism, and distortion) of the lens in accordance with Example 5.

DESCRIPTION OF THE PREFERRED EMBODIMENTS

In the following, embodiments of the present invention will be explained with reference to Examples 1 to 5 according to the accompanying drawings.

Figure 1:
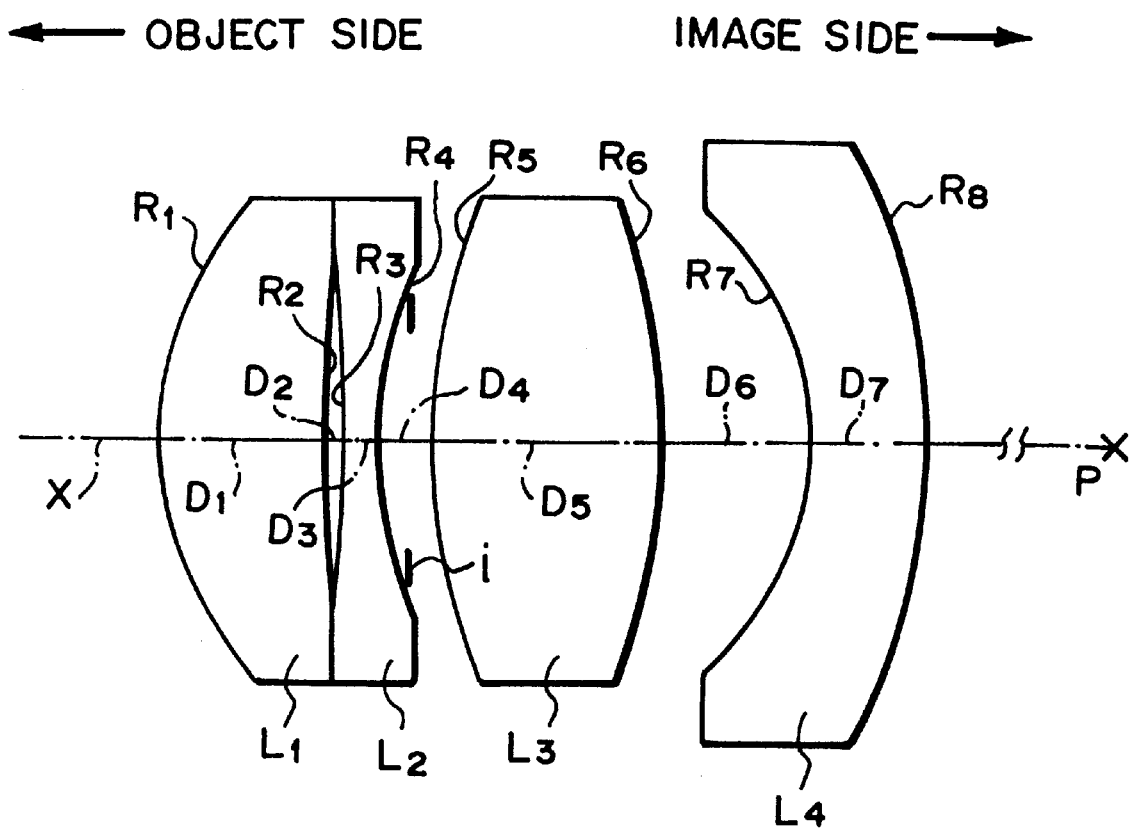
FIG. 1 is a schematic view showing a basic lens configuration in accordance with Examples 1 to 5 of the present invention.
Figure 4A:
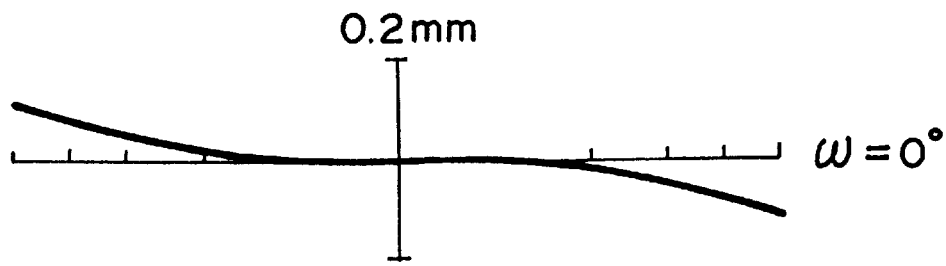
FIGS. 4A, 4B and 4C are aberration charts (showing coma) of the lens in accordance with Example 1.
Figure 4B:
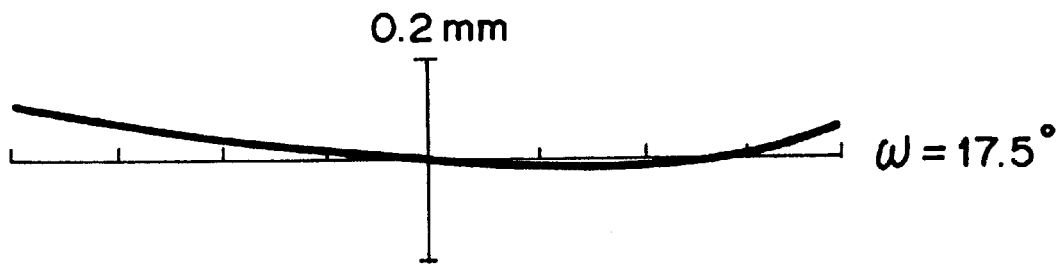
Figure 4C:
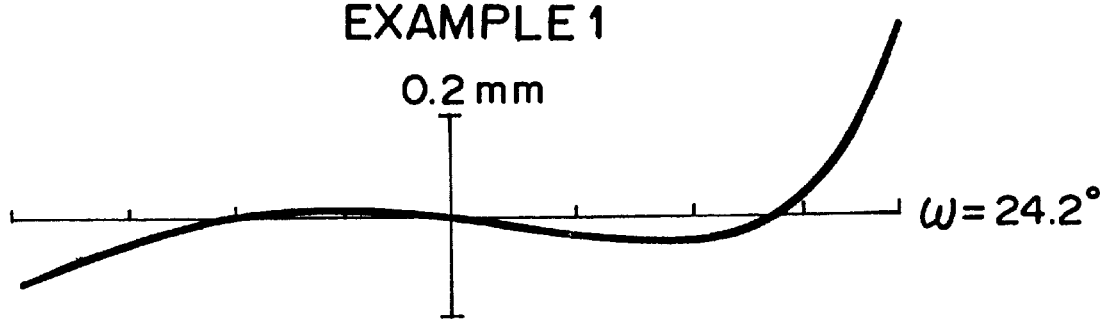
Figure 8A:
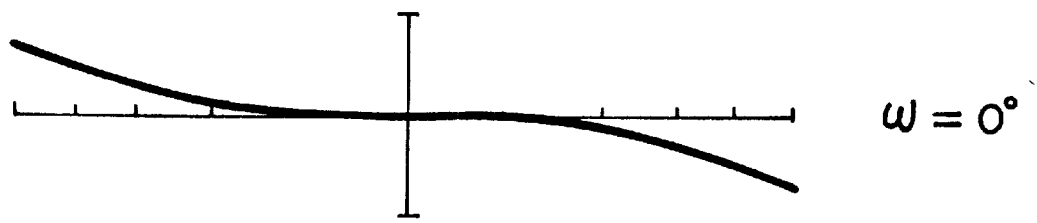
FIGS. 8A, 8B and 8C are aberration charts (showing coma) of the lens in accordance with Example 3.
Figure 8B:
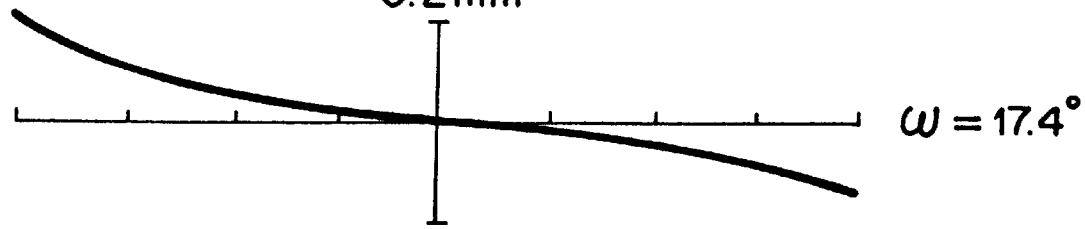
Figure 8C:
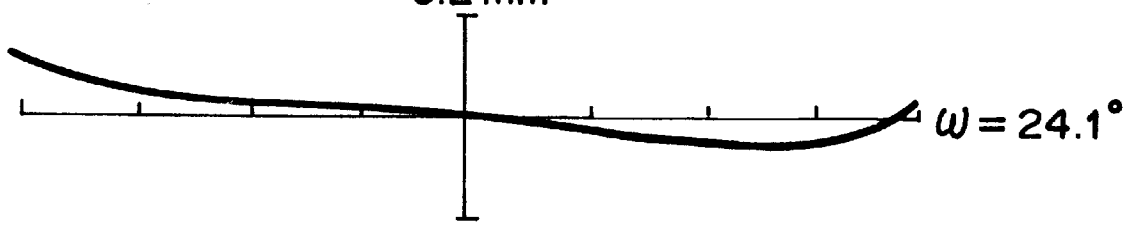
Figure 10A:
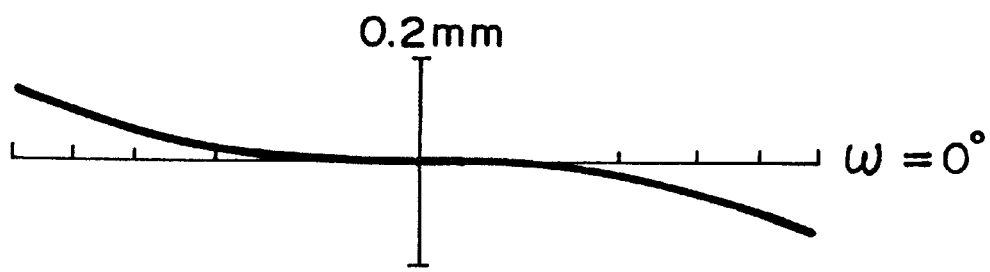
FIGS. 10A, 10B and 10C are aberration charts (showing coma) of the lens in accordance with Example 4.
Figure 10B:
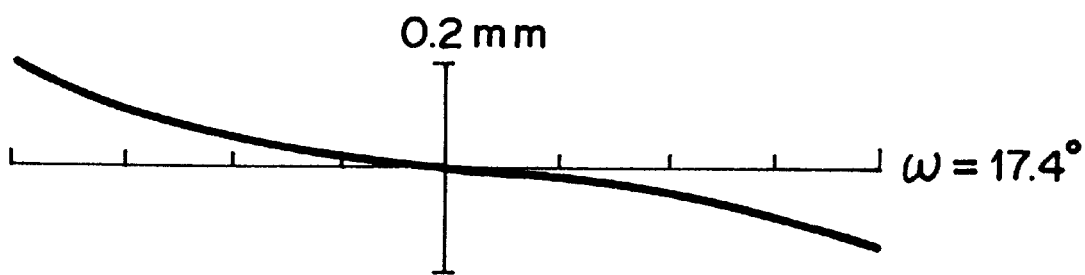
Figure 10C:
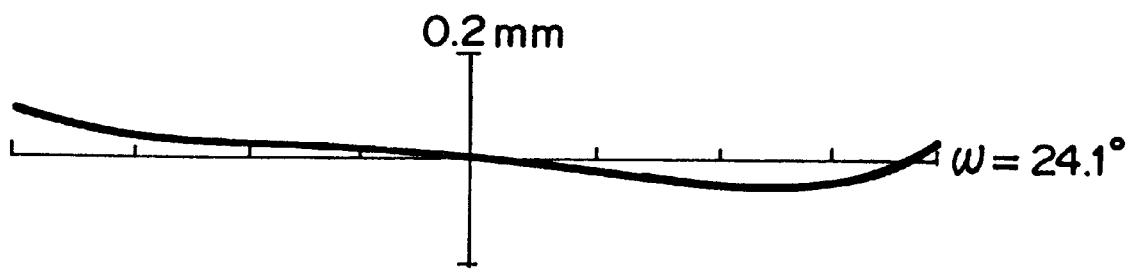

Here, FIG. 1 shows the basic lens configuration of Examples 1 to 5, whereas FIG. 2 shows a schematic configuration of an image readout apparatus using the image readout lens shown in FIG. 1.

As shown in FIG. 2, the imaging lens for image readout (image readout lens) 1 is used for an optical system of an image readout apparatus 2 such as facsimile machine, image scanner, or the like. In this image readout apparatus 2, the imaging lens 1 is disposed between a glass plate 4 for mounting an original 3 and a cover glass 6 of a linear CCD 5, whereas an illuminating device 7 is disposed on the imaging lens side of the glass plate 4.

In this image readout apparatus 2, when the illuminating device 7 emits light toward the original 3, the luminous flux reflected by the original 3 forms an image by way of the imaging lens 1, and thus formed image is read out by the linear CCD 5.

As shown in FIG. 1, the image readout lens 1 in accordance with Examples 1 to 5 is constituted by four elements of lenses $L_1$ to $L_4$, and a stop i disposed between the second lens $L_2$ and the third lens $L_3$, whereby the luminous flux incident thereon from the object side along the optical axis X forms an image at an imaging position P.

Here, the first lens $L_1$ is a positive meniscus lens having a convex surface directed onto the object side, the second lens $L_2$ is a biconcave lens having a surface with a stronger curvature directed onto the imaging surface side, the third lens $L_3$ is a biconvex lens having the same curvature on both surfaces, and the fourth lens $L_4$ is a negative meniscus lens having a convex surface directed onto the imaging surface side.

Also, these lenses satisfy the following conditional expressions:

$$-5.5 < f_{12}/f < -2.8 \tag{1}$$

$$0.36 < f_3/f < 0.46 \tag{2}$$

$$-1.14 < f_2/f_3 < -0.8 \tag{3}$$

$$-8.8 < f_4/D_6 < -6.0 \tag{4}$$

$$0.23 < R_1/f < 0.34 \tag{5}$$

where f is the focal length of the whole lens system;

$f_{12}$ is the composite focal length of the first and second lenses;

$f_2$ is the focal length of the second lens;

$f_3$ is the focal length of the third lens;

$f_4$ is the focal length of the fourth lens;

$R_1$ is the radius of curvature of the first surface; and $D_6$ is the distance from the sixth surface to the seventh surface.

This image readout lens comprises, successively from the object side, the positive first lens $L_1$, the negative second lens $L_2$, the positive third lens $L_3$, and the negative fourth lens $L_4$, whereas each of the pair made of the first and second lenses and the pair made of the third and fourth lenses is formed by positive and negative lenses. Consequently, the aberration generated in the lens on the front side is corrected by the lens on the rear side before becoming too large, whereby the aberration can be corrected efficiently.

In the following, each of Examples 1 to 5 will be explained in terms of specific values.

The image readout lenses in accordance with Examples 1 to 5 are standardized at a focal length of 100 mm. Each example would be proportionally reduced or enlarged in response to the size of the original to be read out, with its focal length determined for each size of the original. In particular, these image readout lenses are suitable for reading out originals extending over the shorter side of A3 size, i.e., 297 mm, the shorter side of Japanese B4 size, i.e., 257 mm, or the shorter side of A4 or letter size, i.e., 216 mm.

EXAMPLE 1

The following Table 1 shows the radius of curvature R (mm) of each lens surface, center thickness of each lens and air space between neighboring lenses D (mm), refractive index N and Abbe number ν of each lens at d-line, and name of glass material of each lens in Example 1.

In Table 1 and Tables 2 to 5 explained later, the numbers designating R, D, N, and ν increase successively from the object side.

The middle part of Table 1 shows the values of F number, focal length f of the whole lens system, imaging magnification β, and half angle of view ω in the image readout lens of Example 1.

Further, the lower part of Table 1 shows the values corresponding to the above-mentioned conditional expressions (1) to (5) in Example 1.

When the image readout lens in accordance with Example 1 is used for reading out the shorter side of A4, the focal length becomes 27.7 mm.

As can be seen from the above table, all the conditional expressions (1) to (5) are satisfied in Example 1. Also, its wideness in angle of view and its brightness are sufficient for an image readout lens.

EXAMPLE 2

The following Table 2 shows the radius of curvature R (mm) of each lens surface, center thickness of each lens and air space between neighboring lenses D (mm), refractive index N and Abbe number ν of each lens at d-line, and name of glass material of each lens in Example 2.

The middle part of Table 2 shows the values of F number, focal length f of the whole lens system, imaging magnification β, and half angle of view ω in the image readout lens of Example 2.

Further, the lower part of Table 2 shows the values corresponding to the above-mentioned conditional expressions (1) to (5) in Example 2.

When the image readout lens in accordance with Example 2 is used for reading out the shorter side of A4, the focal length becomes 27.7 mm.

As can be seen from the above table, all the conditional expressions (1) to (5) are satisfied in Example 2. Also, its wideness in angle of view and its brightness are sufficient for an image readout lens.

Also, the image readout lens in accordance with Example 2 is made of a material free of lead (Pb) and arsenic (As), thus achieving a lighter weight and yielding a configuration which is easy to discard without contaminating the environment.

EXAMPLE 3

The following Table 3 shows the radius of curvature R (mm) of each lens surface, center thickness of each lens and air space between neighboring lenses D (mm), refractive index N and Abbe number ν of each lens at d-line, and name of glass material of each lens in Example 3.

The middle part of Table 3 shows the values of F number, focal length f of the whole lens system, imaging magnification β, and half angle of view ω in the image readout lens of Example 3.

Further, the lower part of Table 3 shows the values corresponding to the above-mentioned conditional expressions (1) to (5) in Example 3.

When the image readout lens in accordance with Example 3 is used for reading out the shorter side of A4, the focal length becomes 27.7 mm.

As can be seen from the above table, all the conditional expressions (1) to (5) are satisfied in Example 3. Also, its wideness in angle of view and its brightness are sufficient for an image readout lens.

EXAMPLE 4

The following Table 4 shows the radius of curvature R (mm) of each lens surface, center thickness of each lens and air space between neighboring lenses D (mm), refractive index N and Abbe number ν of each lens at d-line, and name of glass material of each lens in Example 4.

The middle part of Table 4 shows the values of F number, focal length f of the whole lens system, imaging magnification β, and half angle of view ω in the image readout lens of Example 4.

Further, the lower part of Table 4 shows the values corresponding to the above-mentioned conditional expressions (1) to (5) in Example 4.

When the image readout lens in accordance with Example 4 is used for reading out the shorter side of A4, the focal length becomes 27.7 mm.

As can be seen from the above table, all the conditional expressions (1) to (5) are satisfied in Example 4. Also, its wideness in angle of view and its brightness are sufficient for an image readout lens.

EXAMPLE 5

The following Table 5 shows the radius of curvature R (mm) of each lens surface, center thickness of each lens and air space between neighboring lenses D (mm), refractive index N and Abbe number ν of each lens at d-line, and name of glass material of each lens in Example 5.

The middle part of Table 5 shows the values of F number, focal length f of the whole lens system, imaging magnification β, and half angle of view ω in the image readout lens of Example 5.

Further, the lower part of Table 5 shows the values corresponding to the above-mentioned conditional expressions (1) to (5) in Example 5.

When the image readout lens in accordance with Example 5 is used for reading out the shorter side of A4, the focal length becomes 39.1 mm.

As can be seen from the above table, all the conditional expressions (1) to (5) are satisfied in Example 5. Also, its wideness in angle of view and its brightness are sufficient for an image readout lens.

FIGS. 3, 5, 7, 9, and 11 show the respective aberration charts (each showing spherical aberration, astigmatism, and distortion) of Examples 1 to 5. In these aberration charts, ω indicates the half angle of view. FIGS. 4, 6, 8, 10, and 12 show the respective aberration charts showing coma of Examples 1 to 5.

Figure 12A:
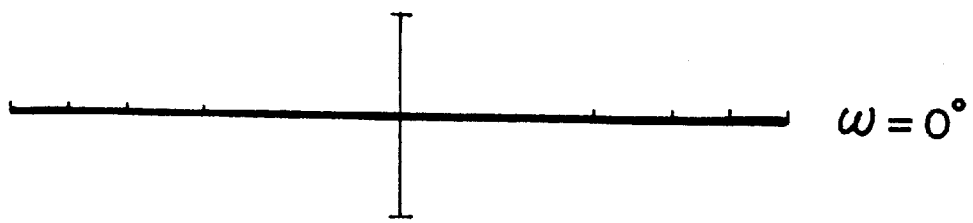
FIG. 12A, 12B and 12C are aberration charts (showing coma) of the lens in accordance with Example 5.
Figure 12B:
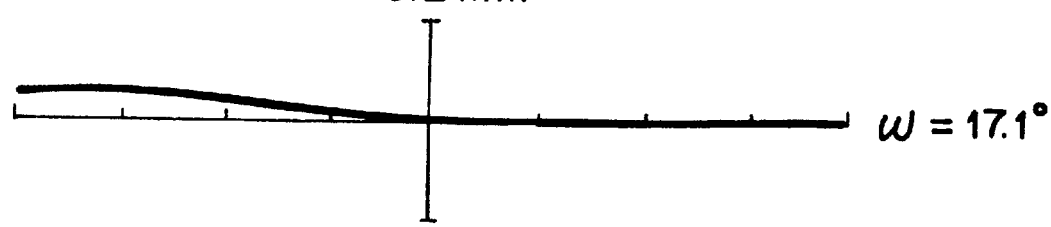
Figure 12C:
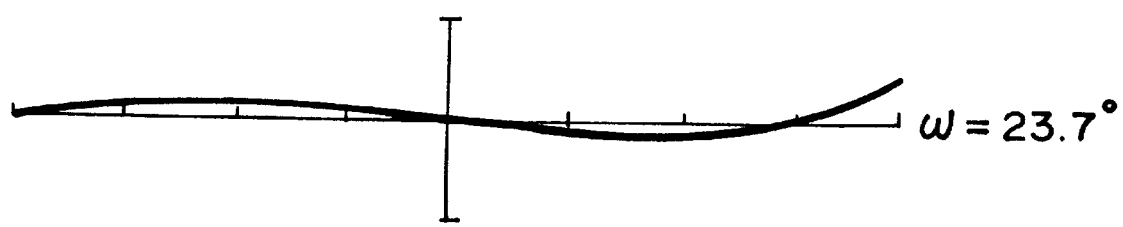

The aberration charts of the image readout lenses in accordance with Examples 1 to 4 shown in FIGS. 3 to 10 are in the state where glass plates (with a refractive index of 1.52) having thicknesses of 11.6 mm and 2.53 mm are included in the optical path on the object side and image side, respectively. The aberration charts of the image readout lenses in accordance with Example 5 shown in FIGS. 11 and 12 are in the state where glass plates (with a refractive index of 1.52) having thicknesses of 7.7 mm and 1.79 mm are included in the optical path on the object side and image side, respectively.

As can be seen from FIGS. 3 to 12, all kinds of aberration mentioned above can be made favorable in accordance with the above-mentioned examples.

Each spherical aberration chart shows aberrations with respect to d-line, g-line, and C-line. Each astigmatism chart shows aberrations with respect to sagittal (S) image surface and tangential (T) image surface.

Without being restricted to the above-mentioned examples, the image readout lens in accordance with the present invention can be modified in various manners. For example, the radius of curvature R of each lens and each lens gap (or lens thickness) D can be changed appropriately.

TABLE 1

| Surface | R | D | $N_d$ | $v_d$ | Glass material |
|---|---|---|---|---|---|
| 1 | 29.007 | 12.676 | 1.63854 | 55.5 | SK-18(SUMITA) |
| 2 | 141.363 | 1.380 | | | |
| 3 | −103.013 | 2.889 | 1.68893 | 31.2 | SF-8(SUMITA) |
| 4 | 35.339 | 4.709 | | | |
| 5 | 51.746 | 17.790 | 1.67003 | 47.2 | BAF-10(SUMITA) |
| 6 | −51.746 | 12.228 | | | |
| 7 | −23.134 | 9.480 | 1.53172 | 48.9 | LLF-6(SUMITA) |
| 8 | −56.263 | | | | |

F/4.5 f = 100 mm β = −0.12992 ω = 24.2°
$f_{12}/f$ = −3.754
$f_3/f$ = 0.415
$f_2/f_3$ = −0.913
$f_4/d_6$ = 6.709
$r_1/f$ = 0.290

TABLE 2

| Surface | R | D | $N_d$ | $v_d$ | Glass material |
|---|---|---|---|---|---|
| 1 | 30.872 | 15.718 | 1.63854 | 55.4 | S-BSM18(OHARA) |
| 2 | 105.431 | 1.436 | | | |
| 3 | −96.081 | 2.885 | 1.72825 | 28.5 | S-TIH10(OHARA) |
| 4 | 44.096 | 3.620 | | | |
| 5 | 60.798 | 17.640 | 1.79952 | 42.2 | S-LAH52(OHARA) |

TABLE 2-continued

| | | | | | |
|---|---|---|---|---|---|
| 6 | −60.798 | 12.980 | | | |
| 7 | −23.573 | 9.466 | 1.70154 | 41.2 | S-BAH27(OHARA) |
| 8 | −42.930 | | | | |

F/4.5 f = 100 mm β = −0.12992 ω = 24.1°
$f_{12}/f$ = −4.330
$f_3/f$ = 0.406
$f_2/f_3$ = −1.012
$f_4/d_6$ = 7.191
$r_1/f$ = 0.309

TABLE 3

| Surface | R | D | $N_d$ | $v_d$ | Glass material |
|---|---|---|---|---|---|
| 1 | 30.561 | 16.048 | 1.62041 | 60.3 | SK-16(SUMITA) |
| 2 | 105.271 | 1.090 | | | |
| 3 | −91.422 | 2.885 | 1.69895 | 30.0 | SF-15(SUMITA) |
| 4 | 44.882 | 3.606 | | | |
| 5 | 61.612 | 17.465 | 1.79952 | 42.2 | S-LAH52(OHARA) |
| 6 | −61.612 | 12.914 | | | |
| 7 | −23.321 | 9.466 | 1.72342 | 38.0 | BASF-8(SUMITA) |
| 8 | −41.948 | | | | |

F/4.5 f = 100 mm β = −0.12992 ω = 24.1°
$f_{12}/f$ = −4.628
$f_3/f$ = 0.411
$f_2/f_3$ = −1.038
$f_4/d_6$ = 7.145
$r_1/f$ = 0.306

TABLE 4

| Surface | R | D | $N_d$ | $v_d$ | Glass material |
|---|---|---|---|---|---|
| 1 | 30.337 | 16.106 | 1.62041 | 60.3 | SK-16(SUMITA) |
| 2 | 104.496 | 1.081 | | | |
| 3 | −92.428 | 2.523 | 1.69895 | 30.0 | SF-15(SUMITA) |
| 4 | 44.625 | 3.612 | | | |
| 5 | 62.250 | 17.476 | 1.79952 | 42.2 | S-LAH52(OHARA) |
| 6 | −62.250 | 12.911 | | | |
| 7 | −23.143 | 9.459 | 1.72342 | 38.0 | BASF-8(SUMITA) |
| 8 | −41.073 | | | | |

F/4.5 f = 100 mm β = −0.12992 ω = 24.10
$f_{12}/f$ = −4.628
$f_3/f$ = 0.415
$f_2/f_3$ = −1.029
$f_4/d_8$ = 7.291
$r_1/f$ = 0.303

TABLE 5

| Surface | R | D | $N_d$ | $v_d$ | Glass material |
|---|---|---|---|---|---|
| 1 | 26.783 | 11.951 | 1.63854 | 55.5 | SK-18(SUMITA) |
| 2 | 102.544 | 1.039 | | | |
| 3 | −107.400 | 2.858 | 1.69895 | 30.0 | SF-15(SUMITA) |
| 4 | 33.082 | 3.641 | | | |
| 5 | 51.842 | 16.851 | 1.70154 | 41.1 | BASF-7(SUMITA) |
| 6 | −51.842 | 10.856 | | | |
| 7 | −22.070 | 8.562 | 1.58144 | 40.8 | LF-5(SUMITA) |
| 8 | −45.173 | | | | |

F/6.0 f = 100 mm β = −0.18898 ω = 23.7°
$f_{12}/f$ = −3.207
$f_3/f$ = 0.396
$f_2/f_3$ = −0.906
$f_4/d_6$ = 7.915
$r_1/f$ = 0.268

What is claimed is:

1. An image readout lens comprising, successively from an object side, a first lens made of a positive meniscus lens having a convex surface directed onto the object side, a second lens made of a biconcave lens, a third lens made of a biconvex lens, and a fourth lens made of a negative meniscus lens having a convex surface directed onto an imaging surface side; satisfying the following conditional expressions:

$$-5.5 < f_{12}/f < -2.8 \quad (1)$$

$$0.36 < f_3/f < 0.46 \quad (2)$$

$$-1.14 < f_2/f_3 < -0.8 \quad (3)$$

$$-8.8 < f_4/D_6 < -6.0 \quad (4)$$

$$0.23 < R_1/f < 0.34 \quad (5)$$

where f is the focal length of the whole lens system;

$f_{12}$ is the composite focal length of the first and second lenses;

$f_2$ is the focal length of the second lens;

$f_3$ is the focal length of the third lens;

$f_4$ is the focal length of the fourth lens;

$R_1$ is the radius of curvature of the first surface; and $D_6$ is the distance from the sixth surface to the seventh surface.

2. An image readout lens according to claim 1, wherein said image readout lens is made of a material free of lead and arsenic.

3. An image readout apparatus employing the image readout lens according to claim 1.

4. An image readout apparatus according to claim 3, wherein said image readout lens is disposed between a glass plate for mounting an original and a cover glass of a linear CCD.

* * * * *